United States Patent [19]

Sticht

[11] Patent Number: 5,271,490
[45] Date of Patent: Dec. 21, 1993

[54] PRODUCTION INSTALLATION

[76] Inventor: Walter Sticht, Karl-Heinrich-Waggerl-Str. 8, A-4800 Attnang-Puchheim, Austria

[21] Appl. No.: 996,009

[22] Filed: Dec. 23, 1992

Related U.S. Application Data

[62] Division of Ser. No. 504,976, Apr. 4, 1990, Pat. No. 5,205,026.

[30] Foreign Application Priority Data

Apr. 4, 1989 [AT] Austria .................................. 791/89

[51] Int. Cl.⁵ ...................... B23P 21/00; B23P 19/00; B65G 37/00
[52] U.S. Cl. ...................................... 198/349; 29/701; 29/720; 29/784; 29/799; 198/346.1; 198/465.2
[58] Field of Search ................. 29/407, 429, 430, 431, 29/33 R, 564, 564.1, 338, 701, 702, 703, 705, 709, 720, 771, 783, 784, 799, 823, 824; 198/339.1, 340, 346.1, 349, 465.2

[56] References Cited

U.S. PATENT DOCUMENTS

| | | | |
|---|---|---|---|
| 2,896,314 | 7/1959 | Godwin et al. | 29/784 X |
| 4,209,898 | 7/1980 | Aoki et al. | 29/784 X |
| 4,492,297 | 1/1985 | Sticht . | |
| 4,530,287 | 7/1985 | Sticht . | |
| 4,619,205 | 10/1986 | Sticht . | |
| 4,674,181 | 6/1987 | Hamada et al. | 29/720 X |
| 4,681,043 | 7/1987 | Sticht . | |
| 4,762,218 | 8/1988 | Sticht . | |
| 4,783,904 | 11/1989 | Kimura | 29/799 |
| 4,884,330 | 12/1989 | Sticht . | |
| 4,977,667 | 12/1990 | Sekimoto et al. | 29/784 |
| 5,103,963 | 4/1992 | Sticht . | |

FOREIGN PATENT DOCUMENTS

| | | | |
|---|---|---|---|
| 13530 | 1/1952 | Japan | 29/720 |
| 245927 | 11/1991 | Japan | 29/720 |

Primary Examiner—Timothy V. Eley
Attorney, Agent, or Firm—Collard & Roe

[57] ABSTRACT

A production installation for assembling or processing structural components comprises drive pallets carrying the structural components or the individual parts, the drive pallets comprising power-driven devices for handling the structural components or the individual parts, a conveyor track comprised of individual and separable conveyor track sections, each conveyor track section comprising vertical and lateral guideways for the drive pallets, a feed device at each conveyor track section operable for conveying the drive pallets independently of each other along the vertical and lateral guideways of the conveyor track, a source for supplying operating energy and/or data to the power-driven handling devices on the drive pallets at selected locations along the conveyor track, and a handling device at each one of the selected locations.

9 Claims, 9 Drawing Sheets

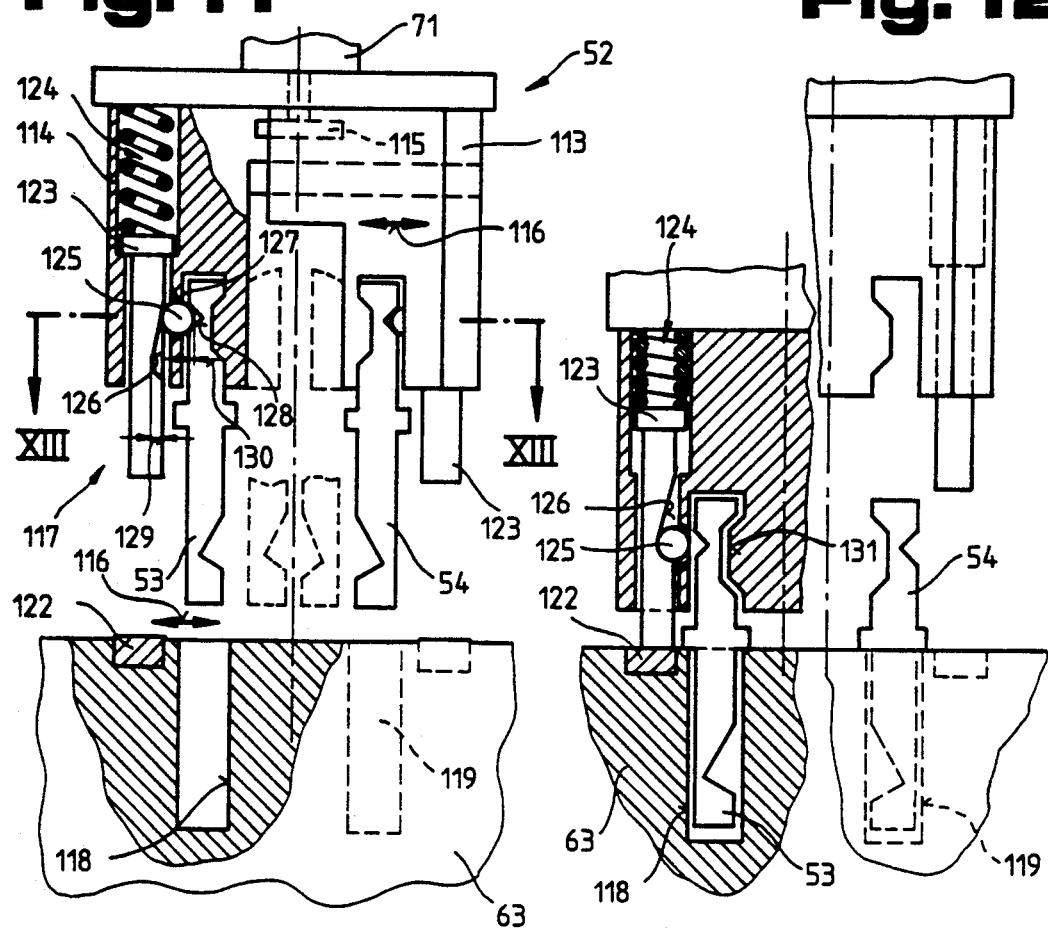

PRODUCTION INSTALLATION

CROSS REFERENCE TO RELATED APPLICATION

This is a division of my copending application Ser. No. 07/504,976, filed Apr. 4, 1990, now U.S. Pat. No. 5,205,026.

BACKGROUND OF THE INVENTION

1. Field of the Invention

The invention relates to a production installation for assembling and/or processing structural components made up of several individual parts wherein the individual parts and/or components are disposed and/or assembled and/or processed on pallet trays which are disposed, preferably interchangeably, on carriages which are guided along the conveyor track of a conveyor device in which the conveyor track has parallel conveying paths extending in sections parallel to a main conveying path and connected by transverse conveying paths to the main conveying path.

2. Description of the Prior Art

In installations of this type. a basic distinction can be made between so-called loosely concatenated and rigidly concatenated installations. In loosely concatenated installations, the workpiece carriers or carriages are moved along the installation completely independently of one another and, in the event that a device in a single workstation breaks down, for a specific period of time this has virtually no effect on the activity of the other workstations. In rigidly concatenated installations, the workpiece carriers are interconnected in their movement so that, if faults arise in the vicinity of one workstation, all the workpiece carriers and all the workstations are blocked Each of the two types of installation has its own range of application, the rigidly concatenated installations being used where only a few workstations are concatenated since the total utilization rate is a product of the utilization rates of the individual workstations. Loosely concatenated installations are generally used to concatenate a multiplicity of workstations, e.g. up to 40 or more, since in this case the utilization rate is then a value compounded from the individual occurrences of faults rather than the product of the utilization rates in the individual stations.

Many different installations with loose concatenation are already known—for example, from my U.S. Pat. Nos. 4,681,043, 4,762,218, 4,619,205, 4,530,287 and 4,492,297—which have proved successful in practice for concatenating a plurality of workstations. The workpiece carriers or carriages are in each case guided along lateral and vertical guideways independently of one another, and appropriate use of conveying rollers pressed against the side surfaces of the workpiece carriers ensures lateral and vertical guidance of the workpiece carriers without any play. Thus, accurate positioning of the workpiece carriers is achieved throughout the entire course of such an installation in cooperation with the drive means.

It is also known from my U.S. Pat. Nos. 4,884,330 and 5,103,963 to arrange the individual parts at as early a time as possible in a predetermined order which is to be maintained up to the point of their assembly in a workstation or processing station. For this purpose, the individual parts are individually deposited into unit receivers and are moved in a workstation or processing station into a reference position relative to an assembly workpiece carrier which is similarly an independently movable carriage whereupon the individual parts are removed from the unit receiver and are assembled or processed on the assembly workpiece carrier or an assembly location provided there. A work area which is separated from the workstations or processing stations, possibly with storage devices interposed, is provided for fitting the individual parts into the unit receivers. This process and apparatus have proved eminently successful in practice for fully automated processing and assembly processes although it has proved difficult to achieve a combination of manual and fully automated assembly processes within the same installation using this process and this apparatus.

The aim of the present invention is to provide a production installation of the type mentioned initially which permits flexible adaptation even to components which are to be assembled in smaller piece numbers, both in terms of the individual parts required and in terms of the tools required, and which should moreover be as inexpensive as possible to manufacture while having a high reutilization rate.

The aim of the invention is achieved in that there is associated with, parallel to and directly adjacent to the parallel conveying path, a subsidiary conveying path which is connected preferably by junction stations to the transverse conveying or parallel conveying path and/or the main conveying path. This arrangement of the parallel conveying path and a subsidiary conveying path directly alongside it creates the possibility of providing several workpiece carriers or pallet trays in the handling or working range of an operator for manipulating parts or carrying out assembly processes but at the same time also makes it possible to position the grab holders, in which individual parts are held in readiness for assembly or manipulation, for the operator in the manipulation range in question and at the same time to change them quickly. In an astonishingly simple manner, this creates the possibility of feeding the correct individual parts required for individual assembly processes to the operator and, if necessary, of precisely determining the number of parts, thereby preventing faulty assembly especially in the case of components having a small number of parts and different individual parts and also; allowing a wide variety of types of component to be perfectly processed or assembled.

According to a specific embodiment, the subsidiary conveying path is disposed on the side of a parallel conveying path remote from an operator and a storage conveying path is associated with this subsidiary conveying path, preferably between it and the main conveying path, with the result that the carriage for the pallet tray, on which the manipulation or assembly processes are carried out, is located closer to both operators than the subsidiary conveying path on which the parts for processing are placed in readiness or the grab holders are positioned.

It is further possible for an adjustable safety device to be disposed between the parallel conveying path and the subsidiary conveying path, said safety device preferably being formed by a guard plate which is disposed below a conveying plane of the subsidiary conveying path and is adjustable by means of a drive at right angles to the conveying plane into a position projecting out over the conveying plane, this being a simple means of preventing the operator from reaching into the region of the subsidiary conveying path, thereby permitting fully automatic movement of the carriages operating there and of the tools disposed thereon and allowing the use of conveyor devices which cannot be used to operate carriages in locations where manual work is carried out.

This is also possible for the reason that each change of type requires the work to be interrupted anyway and in order that the operator does not need to intervene in the region of the subsidiary conveying path during this process of changing type. It is also advantageous if this guard plate is disposed below the conveying plane of the subsidiary conveying path since this does not obstruct the work of the operator and it also does away with an oppressive guillotine-like overhead arrangement and the psychological stress on the operator which this entails.

According to a further development, it is provided that containers for individual parts are disposed on the carriages in the subsidiary conveying path, thereby allowing the operator to work with equipment he is familiar with, e.g. containers in the form of grab holders, and yet affording the advantage of rapid interchangeability of containers when assembling different parts or types of component.

It is also advantageous if the transverse and/or subsidiary and/or parallel conveying paths are connected to stand-by conveying paths since carriages with superstructural parts or pallet trays or grab holders, which are required, for example, only for a short duration or for quite specific manipulation processes or for retooling of the workplace or of the handling or processing equipment disposed in the workplace, can easily be held in readiness or used in the stand-by conveying paths.

According to a further embodiment, a pallet tray in the form of a retooling pallet having receivers for tools or grab fingers, text and/or setting devices and/or replacement equipment and possibly retooling parts is disposed on the carriage, thereby substantially facilitating the adaptation of a handling device for manipulating or assembling or processing different parts and inspection thereof and also, for example, the adjustment of measuring devices, which are connected to the handling and processing devices, by means of standard measuring instruments or the like and dispensing with the need for the usual outlay for additionally disposed changing devices through the use of standardized carriages with conveying paths. As a result of the direct placing together of the conveying paths, it is also easily possible to achieve manipulation of the piece parts or components with just a few positioning movements.

It is also possible for the stand-by conveying path to be connected by the main conveying path to the parallel conveying path so that central stand-by conveying paths can be disposed with the result that the carriages, which are parked therein and on which the containers or pallet trays, tools or the like are disposed, can easily be fed to different parallel conveying paths.

It is also advantageous, however, if a central stand-by conveying path is provided for several conveying paths since the carriages frequently required for each assembly machine and having different tools, measuring instruments and the like can then be centrally parked.

According to another embodiment, the carriage having the retooling pallet is movably disposed on the subsidiary conveying path, thereby allowing the operator or the handling appliances and machines disposed in the vicinity of the workstation or processing station to have direct access at any time to the retooling pallet.

According to a further embodiment, a return conveying path is disposed between the parallel conveying path and the main conveying path, thereby allowing the alternately required carriages with the containers or pallet trays disposed thereon to be interchanged very rapidly and stored in the intervening period in the direct vicinity of their area of use.

It is also possible for the storage conveying path and/or the return conveying path simultaneously to form the stand-by conveying path, with the result that the storage or return conveying path can be used at the same time as a stand-by conveying path.

However, it is also advantageous if the parallel conveying path and the subsidiary conveying path are directly adjacent to one another, with the safety device interposed, and the storage conveying path or the return conveying path is disposed at a distance from these since this means that the carriages with their superstructural parts can move in the storage conveying path or return conveying path without endangering the operator even if the safety devices have been released or removed and the manual work sequence is being carried out in the parallel conveying path and the subsidiary conveying path directly adjacent to it.

Furthermore, it is also possible for a feed device for the carriages, which can be independently acted upon by the other feed devices, to be associated with the operator in the parallel conveying path, thereby additionally preventing any risk of injury to the operator while the carriages within his operating range are being manipulated.

According to a further embodiment, a parallel conveying path and at least one subsidiary conveying path are disposed immediately adjacent and parallel to one another, and a handling device is arranged so as to span these conveying paths at right angles to the conveying direction, thereby allowing the manipulation times to be kept very short for shifting individual parts or carrying out operating processes which involve the carriages disposed next to one another on the two conveying paths and the superstructural parts disposed thereon.

However, it is also further possible for carriages having pallet trays to be disposed on the parallel conveying path and for a carriage having a pallet tray with assembly receivers, or a retooling pallet and possibly a drive pallet to be disposed on the subsidiary conveying path, thereby allowing the parts to be processed on the assembly receivers to be easily supplied from the carriages on the subsidiary conveying path.

According to another advantageous construction, two subsidiary conveying paths are associated with the parallel conveying path, parallel and immediately adjacent to it, and carriages having pallet trays with component and/or unit receivers and possibly an assembly receiver are disposed movably along the conveying direction on the parallel conveying path and carriages having pallet trays for a plurality of, in particular identical, individual parts are provided movably along the guideways on a subsidiary conveying path and a pallet tray is movably disposed on the further subsidiary conveying path and has at least grab tools or grab fingers and possibly assembly receivers and/or receivers for incorrectly processed components, thereby allowing the working times for an assembly cycle to be kept very short and at the same time keeping down the necessary cost of manufacturing such production installations.

According to another embodiment, the containers for the individual parts or the pallet trays are detachably mounted on the carriages by means of coupling devices of an identical type, thereby allowing the different container and pallet trays to be disposed and reliably transported in the correct position on the same carriages.

It is also advantageous if the coupling device has centering elements, e.g. centering pins, for the containers and pallet trays since it is then possible, independently of the coupling device, to achieve a precise alignment of the containers and pallet trays and dimensionally accurate positioning and centering on the carriages.

However, it is further possible for the containers to be provided with preferably adjustable or swingable chutes, preferably in the form of gripping cups, thereby allowing the quantity of individual parts made available to the operator to be easily regulated and allowing the outlet opening in the container to be closed simultaneously by the chute, resulting in easy transportation on carriages without any loss of individual parts.

It is also advantageous if the containers for the individual parts take the form of wash tanks because then the individual parts to be supplied for assembly can be washed directly prior to the assembly or processing process and supplied for this process without further manipulation.

However, it is also possible for the chutes to be provided with guide channels for isolated individual parts, said channels being disposed on the same level as corresponding guide channels on pallet trays or on the same level as assembly receivers, since this means, particularly in the case of cleaned parts, that these parts need be touched as little as possible and also the time required for correctly positioned supply of the individual parts on the pallet trays or to the assembly receivers is kept very short.

According to a further embodiment, a plurality of carriages provided with containers for individual parts are disposed downstream of one another on the subsidiary conveying path and are preferably positionable by means of positioning devices which are independent of one another. This means that several containers disposed on different carriages can be moved along the subsidiary conveying path always into a different stand-by position in order, for example, to provide the operator with the required individual parts at the same spot in each case.

It is, however, also advantageous if the carriages and/or the pallet trays and/or the containers are provided with coding elements with which coding devices disposed along the various conveying paths are associated as this substantially simplifies automatic management and accurately targeted supply to the individual conveying paths without manual control.

It is, however, also possible for transfer devices for data and/or energy to be disposed in the storage and/or stand-by and/or subsidiary conveying path and to be associated with transfer elements of the transfer device on the carriages and/or the containers and/or the pallet trays, thereby allowing, for example, processing data regarding the individual workpieces or the like disposed on the pallet trays to be stored directly onto these and to be read at any point into an information network or into memory units, processing devices or handling devices. It is further possible to display these data on a screen assigned to the operator so that he can, for example, use or assemble the individual parts required according to measuring results. Above all, when using transfer devices which also permit contact-free transmission of drive energy to the carriages or corresponding superstructural parts, it is possible to undertake certain adjustment operations in the course of processing or supply or transport if an energy-storing device, e.g. a battery, is additionally disposed on the running mechanism.

In a preferred form, it is possible for the transfer device to include an energy field which is built up between the transfer elements so that sufficient energy can be supplied to the individual carriages and the superstructural parts disposed thereon, such as pallet trays, containers or the like, without obstructive contacts and the problems these entail.

It is also further possible for the carriages and/or the grab holders and/or the pallet trays to be provided with display elements, in particular plain-text displays, so that it is possible at any time to check manually whether the processing or handling operations are being correctly carried out.

It is, however, also advantageous if the pallet tray is provided with one or more, possibly different, assembly receivers. This makes it possible to carry out the assembly processes on easily interchangeable retooling pallets and to use the other carriages, with the pallet trays or containers disposed thereon, to transport the individual parts or the components to be assembled between the individual workstations, thereby keeping down the cost of the assembly receivers, which are to some extent very expensive owing to their high precision, by reducing their number.

It is also advantageous if the retooling pallet and/or a pallet tray is provided with receivers for faulty components, making it easy to separate out components, in which assembly has been incorrectly carried out or incorrect individual parts have been assembled, and convey them separately to an aftertreatment station or special place of deposit.

According to another embodiment, control mechanism for a coupling device is disposed on the retooling pallet and/or a drive pallet associated with the retooling pallet between a grabbing tool and/or grab tray and a handling device. The advantage of using a separate drive pallet, which can be used to activate control mechanisms disposed on another carriage, is that one and the same drive pallet can be used to supply drive energy to different positions of another carriage or the superstructural parts disposed thereon.

It is, however, alternatively possible for the drive pallet to be connected to its own energy supply and/or control device or to a transfer element of a transfer device for energy and data at least in the region of the handling device, so that the drive pallet can be used at various points to act upon various actuating drives and, in the case of use of an energy-storing device, it need be re-supplied with energy and the necessary data for carrying out the next operating tasks only in its stand-by region.

According to a preferred embodiment, the grab device is provided with grab fingers which have a longitudinal guideway for grab trays and locking devices are associated with these longitudinal guideways in the grab fingers, making it possible to achieve precise guidance of the grab trays in the grab fingers and hence a rapid and easy interchange without expensive independent adjustment mechanisms.

It is also possible for the locking device to have a locking plunger or an unlocking piston which is disposed so as to be movable in a direction at right angles to the longitudinal guideway and cooperates with a ball catch or a pivoted lever so that unlocking of the grab trays can be achieved automatically by the grab device being lowered and the grab fingers being supported on a pallet tray or a retooling pallet.

Finally, it is also possible for support rails disposed on a pallet tray to be associated with the locking plunger or unlocking piston, said support rails having at least a length which corresponds, in the case of a length of the longitudinal guideway corresponding to the breadth, to the breadth and being disposed centrally relative to receivers for the grab trays, so that removal and insertion of the grab trays is possible by moving the carriage having the pallet tray or transfer pallet relative to the grab device.

BRIEF DESCRIPTION OF THE DRAWING

For a clearer understanding of the invention, it is described in greater detail hereinafter with reference to the embodiments illustrated in the drawings wherein

FIG. 11 shows a side view, partially in section, of a grab device of a handling device with interchangeable grab trays;

FIG. 12 shows a side view, partially in section, of the grab device of FIG. 11 in half-section during depositing of a grab tray in a pallet tray or a retooling pallet;

FIG. 13 shows a plan view of a section of the grab device along the lines VIII—VIII of FIG. 11;

DETAILED DESCRIPTION OF PREFERRED EMBODIMENTS

Figure 1:
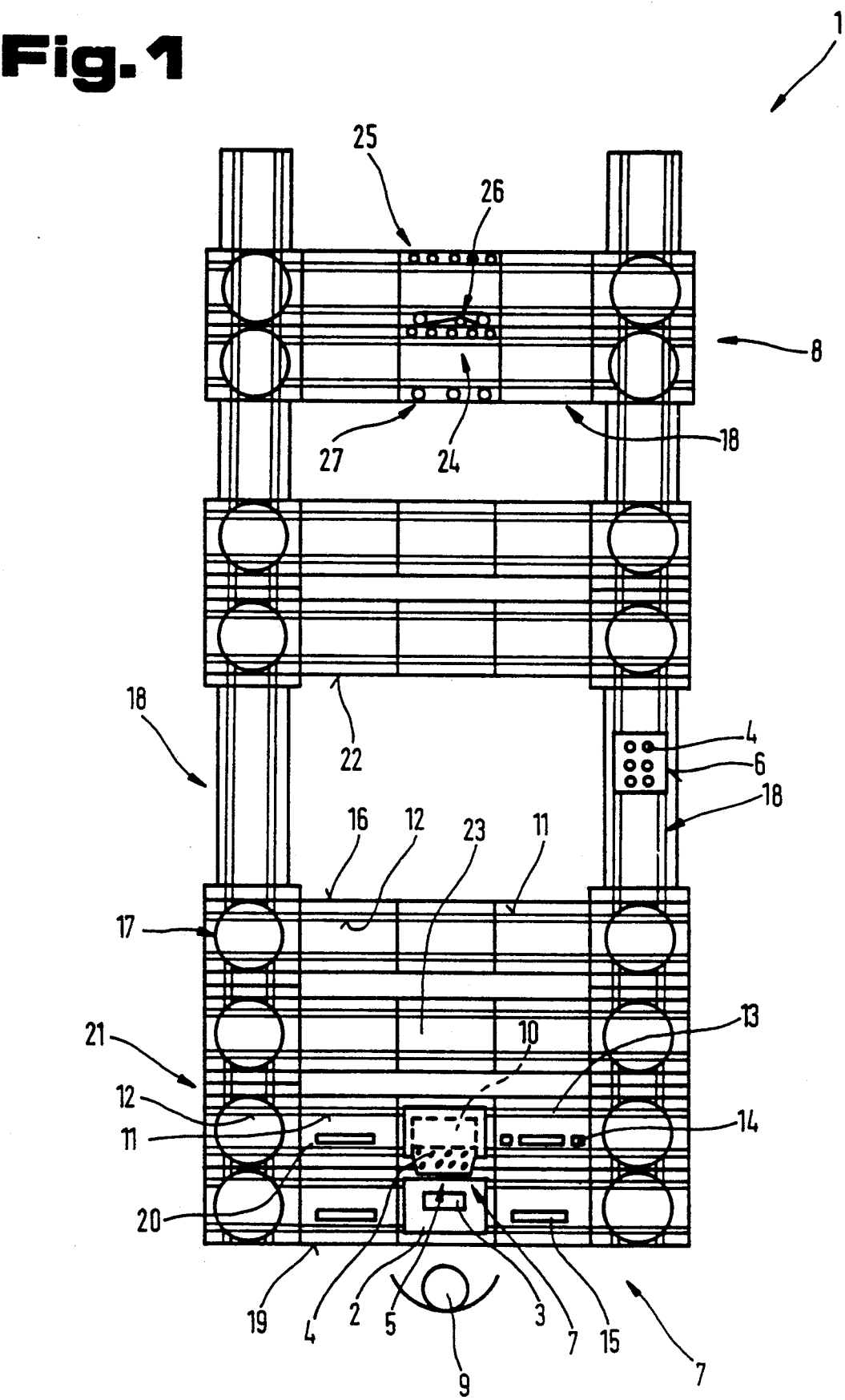
FIG. 1 shows a plan view in a simplified diagrammatical form of a production installation made up of several rectangular track sections and having, in accordance with the invention, feed devices of varying construction.

FIG. 1 shows a production installation 1 which is used for processing or assembling components 3 disposed on carriages 2. These components 3 are made up of a large number of individual parts 4 which are placed in readiness for assembly in containers 5 or on pallet trays 6. Such a production installation may comprise, for example, a workstation 7 and a workstation 8. Manipulation, assembly and processing operations are carried out by an operator 9 in the workstation 7, while the workstation 8 takes the form of a so-called CNC module, i.e. a fully automated assembly and processing station. Assembly carriages 2 and carriages 10 for the containers 5 or the pallet trays 6 are preferably of an identical type and can be moved from one workstation 7 to the other workstation 8 independently of one another by means of feed devices 15 along vertical and lateral guideways 13 and 14 formed by individual track sections 11, 12, i.e. by means of so-called loose concatenation.

The individual track sections 11, 12 are disposed on transport stations 16 or junction stations 17. The transport stations 16 and junction stations 17, which may also be referred to as transport and junction modules since they are advantageously of identical dimensions and can be joined together in any desired layout, may be arranged in any order to form the main conveying paths 18 and parallel conveying paths 19 or subsidiary conveying paths 20 which are required to put together such a production installation 1. Transverse conveying paths 21 may be provided for connecting these main conveying paths 18, parallel conveying paths 19 and subsidiary conveying paths 20. In addition, return conveying paths 22 and storage conveying paths 23 may also be provided to enable the same carriages 2 to run several times through a main conveying path 18 or a parallel conveying path 19 past an operator 9. Feed devices 15 and 26 or 27 of varying construction may then be disposed for these transport and junction stations 16 and 17 and transport stations 24, 25 in the region of the workstation 8.

Figure 2:
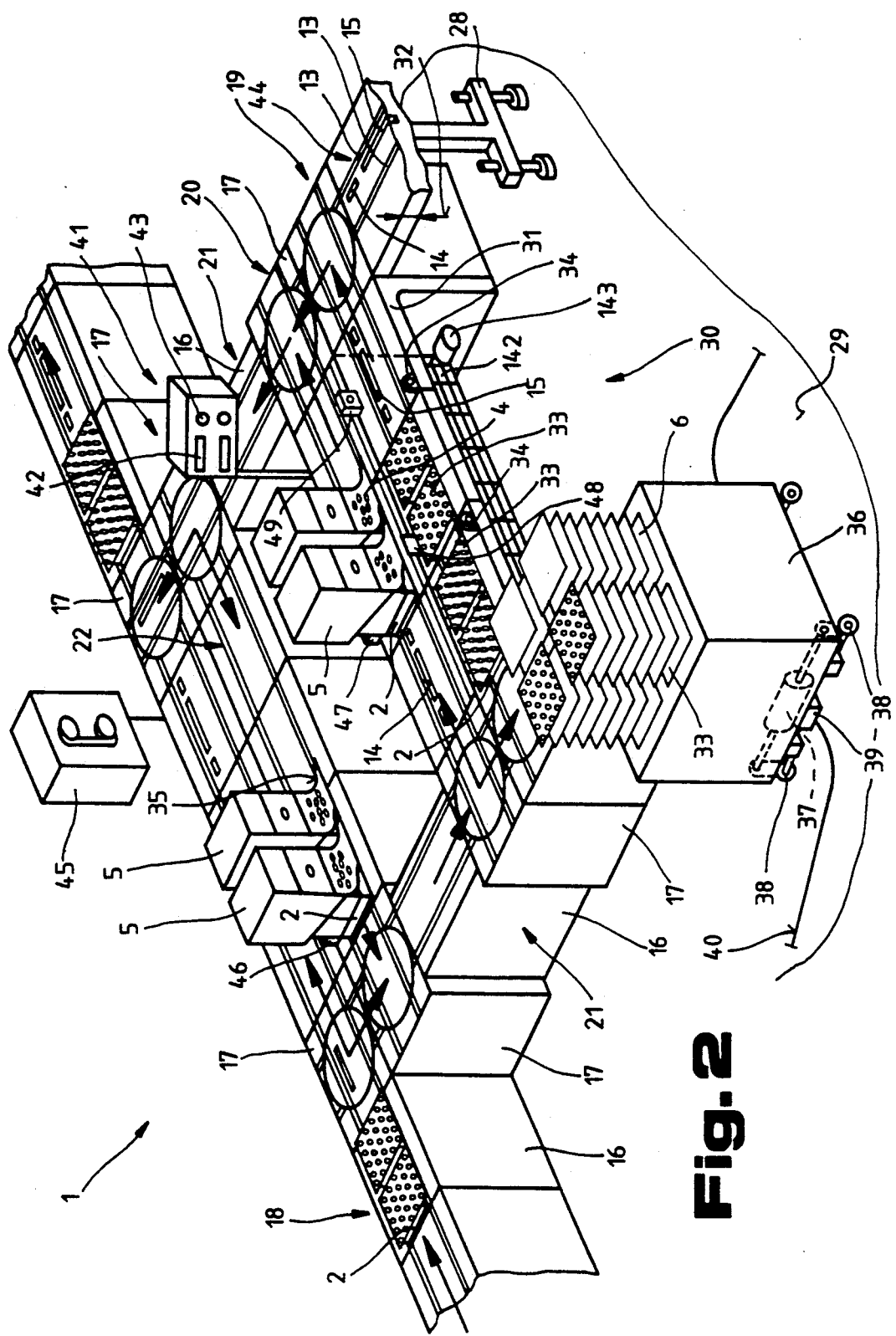
FIG. 2 shows an extremely simplified, diagrammatical view of part of a production installation in the region of a manual work site with the carriages disposed in this region and the pallet trays and grab holders disposed thereon.

FIG. 2 shows part of a production installation 1 having a main conveying path 18, a parallel conveying path 19, a subsidiary conveying path 20 and a return conveying path 22. The parallel conveying path 19, the subsidiary conveying path 20 and the return conveying path 22 are each connected to the main conveying path 18 by means of junction stations 17, which also form integral parts of transverse conveying paths 21 and between which, as illustrated, a transport station 16 may also be disposed. The main conveying path 18 is connected to the parallel conveying paths 19 similarly by means of junction stations 17. As is diagrammatically illustrated at one point only for the sake of clarity, the individual transport stations 16 and junction stations 17 may be supported by means of support elements 28 on a contact surface 29, for example the floor of a production bay.

The parallel conveying path 19 forms a manual work site 30 where, as FIG. 1 shows, an operator 9 carries out handling or assembly jobs. For this purpose, transport stations 31 may have a lower height 32 than the transport stations 16 in order to afford the operator 9 more leg room. Containers 5, e.g. grab holders, are disposed in the subsidiary conveying path 20 on carriages 2 which are movable along the vertical and lateral guideways 13, 14. Located in these grab holders are individual parts 4 which will be placed and assembled on pallet trays 6 and 33. Each of these pallet trays 6 or 33 is disposed on its own carriage 2. However, it is just as possible for several of these pallet trays 6 or 33 to be disposed on a common carriage 2. The carriages 2 of both the containers 5 and the pallet trays 6 and 33 are of identical construction and are moved forward by means of feed devices 15 along the lateral and vertical guideways 14 and 13 and are stopped and positioned in the required positions along these guideways.

Independent buttons 34 for two-hand operation may be provided, for example, to actuate the feed devices 15 in the region of the parallel conveying path 19 so as to avoid injury to the operator when the individual carriages 2 with the pallet trays 6, 33 disposed thereon are moving. As is later described in more detail, the grab holders are provided with grab cups 35 to permit ergonomic removal and grasping of the individual parts 4. As is shown, it is also possible for the pallet trays 6 and 33, either empty or filled with individual parts 4, to be moved by a transport carriage 36 into the region of the parallel conveying path 19 so that the operator can deposit these pallet trays 6 and 33 onto the transport carriage 36 or remove the trays from it. The transport carriage 36 may also be self-propelled by providing it with its own drive motor 37 and steerable wheels 38 as well as with a scanning head 39 for controlling the steerable wheels 38 and the drive motor 37 in response to signals from a conductor 40 which is, for example, set into the track. Among other things, it is also possible to keep empty pallet trays 6 in reserve on the transport carriage 36 in order to fill them with individual parts 4 in the region of the parallel conveying path 19, while the pallet trays 33 with finished components 3 can be deposited on the transport carriage 36 for further processing or packing.

While the pallet trays 6 required for the individual components 3 for assembly can then be easily adapted to different components 3 by using, for example, the transport carriage 36, it is similarly possible by arranging the subsidiary conveying path 20 to interchange the containers 5 or the grab holders with the grab cups 35 in the event of a change of type by moving them by means of their carriages 2. For this purpose, further containers 5 on carriages 2 can be kept in reserve in a return conveying path 22, which can, for example, also be used as a storage conveying path, and can be swapped in the event of a change of type with the containers 5 located in the subsidiary conveying path 20. Instead of the two containers 5 shown in the subsidiary conveying path 20, it is of course also possible, in the event of a change of type, for several containers 5 or only a single container 5 to be parked there. It is further possible, in the event of a change of type, to bring over the containers 5 with the relevant required individual parts 4 from a central feeder station or to move up the containers 5 with the new individual parts 4 for processing on their own transport carriage 36, while the containers 5 no longer required can be transported away by the transport carriage 36. To provide the operator with comprehensive information about the work processes to be carried out and possibly about his work output and to enable the operator to communicate with his superior without having to leave his post, a display and operator unit 41 which may comprise a display field 42 and an operator field 43 is disposed in the region of the parallel and subsidiary conveying paths 19, 20. Several liquid-crystal displays may be disposed at the display field 42, or alternatively a screen on which the work processes to be carried out by the operator and possibly, using a help key, additional operator's instructions can be called or the residual piece numbers or the piece numbers yet to be produced can be displayed in plain text. At the operator field 43, the work processes required for a change of type can be initiated or additional information can be requested from a superior or the higher-level central computer. If it is also necessary for the operator to be equipped with suitable auxiliary tools for the manipulation and assembly processes or if the work site has to be reorganized owing to changes in the components to be assembled, it is also possible to provide a stand-by conveying path 44 which can be used to introduce further carriages 2, which may be equipped, for example, with the necessary retooling parts or tools, into the parallel conveying path 19, it being possible also to use this stand-by conveying path 44 to interchange individual carriages 2 and to swap carriages 2 with permanent superstructural parts for others with similarly permanent but different superstructural parts.

In order to manage the individual carriages 2 in conjunction with the display and operator unit 41 and a higher-level control device 45, which may be connected by lines to the individual display and operator units 41, the carriages and/or the containers 5 and the pallet trays 6 and 33 may be provided with coding elements 46, 47 and 48 which may be scanned in the region extending along the individual track sections 11 and 12 of the individual transport stations 16 and junction stations 17 by means of decoding devices 49, of which only one is diagrammatically illustrated. Known devices employing magnetic cards, bar codes or any other type of data carrier may be used for this decoding device 49 and the coding elements 46 to 48.

The design of the vertical and lateral guideways 13, 14 and of the feed device 15 as well as the design of the carriages 2 is similarly entirely discretionary. However, preferential use is made of feed devices 15 of the type described, for example in my U.S. Pat. Nos. 4,492,297, 4,619,205 and 4,762,218. It is equally possible, however, to use the feed devices 15 described below both in the junction stations 17 and in the transport stations 16.

It is furthermore also possible, as will be described in greater detail hereinafter, for the containers 5 or the grab holders forming these to be interchangeably placed on the carriages 2. This allows these containers 5 located in the subsidiary conveying paths 20 to be moved into the region of the parallel conveying path 19 so that they can be exchanged by the operator for containers holding different individual parts 4.

Figure 3:
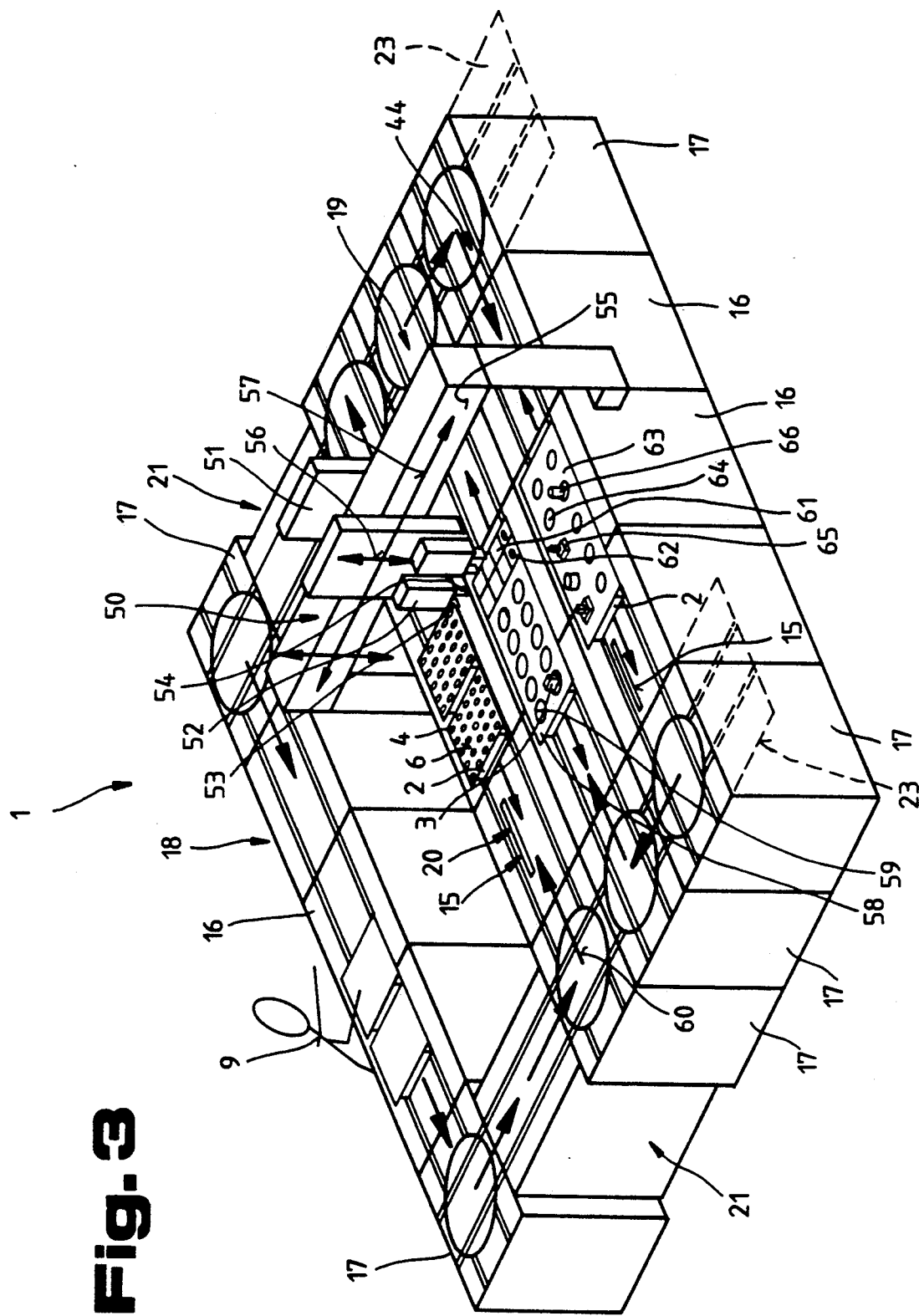
FIG. 3 shows an extremely simplified, diagrammatical view of part of a production installation in the region of an assembly cell.

FIG. 3 shows an arrangement of various track sections comprising transport stations 16 and junction stations 17 which may, for example, form a so-called CNC module, i.e. a computerized numerical control module, or a CAA, a computer aided assembly module. While individual transport stations 16 with two junction stations 17 form a main conveying path 18, a parallel conveying path 19 and a subsidiary conveying path 20 as well as a stand-by conveying path 44 are arranged so that they are connected to the main conveying path 18 by transverse conveying paths 21. Each of these conveying paths 19, 20 and 44 is connected by junction stations 17 of the transverse conveying paths 21 to the main conveying path 18. The parallel conveying path 19, the subsidiary conveying path 20 and the stand-by conveying path 44 are spanned by a handling device 50 which may, for example, have a slide 51. In the present embodiment, two grab devices 52 with grab fingers 53, 54 are disposed on the slide 51. It is equally possible, however, for only one grab device 52 to be disposed on this slide 51.

It is also possible for the slide 51 to be adjustable vertically in the directions of the double arrow 56 relative to a horizontal guideway 55. It is equally possible, however, for the entire horizontal guideway 55 to be adjustable in the directions of the double arrow 56 relative to the parallel conveying path 19 or the subsidiary conveying path 20 and the stand-by conveying path 44. While the carriages 2 are being positioned in the parallel conveying path 19 and in the subsidiary conveying path 20 as well as in the stand-by conveying path 44 by means of the feed devices 15, individual parts 4 or components 3 are being transferred in the direction of the double arrow 56 or a double arrow 57 by means of the handling device 50. Thus, while an individual part 4, for example, has been removed from a pallet tray 6 by the handling device 50 and is moved into the region of a pallet tray 58 with assembly receivers 59, the next individual part for removal can be moved into position in the direction of transport—arrow 60—by moving the carriage 2.

Naturally, the carriages 2 may also be made to move counter to the direction of travel indicated by the arrow 60 to permit flexible positioning relative to the handling device 50. The pallet tray 58 may also be provided with receivers 61 for incorrectly assembled components 62. Finally, a pallet tray 63 having receivers 64 for change tools 65 may be disposed on the carriage 2 located in the stand-by conveying path 44. Furthermore, as extensions to the transverse conveying paths 21, storage conveying paths 23 my be provided on which the pallet trays 63 having the change tools 65 for components 3 to be differently assembled are kept in reserve so that a change in the type for assembly can be rapidly effected in the region of the production installation 1 formed by a so-called assembly cell. Movement of the change tools 65 and interchanging of the grab fingers 53, 54, for which swapping tools 66 can similarly be held in reserve in the receivers 64, are effected by means of the handling device 50. Forward movement and positioning of the individual change tools and swapping tools 65, 66 are similarly effected by means of the feed devices 15 as these are disposed in the region of all the transport stations 16.

The exchange of empty pallet trays 6 for pallet trays 6 filled with individual parts 4 may be effected, for example, in the region of the main conveying path 18 by an operator 9. However, it is equally possible for the empty pallet trays 6 to be filled with individual parts 4 by the operator 9. The pallet trays 6 may of course alternatively by exchanged automatically or be filled with individual parts by a handling device 50 in conjunction with an automatic supply and distribution device for the individual parts 4.

Figure 4:
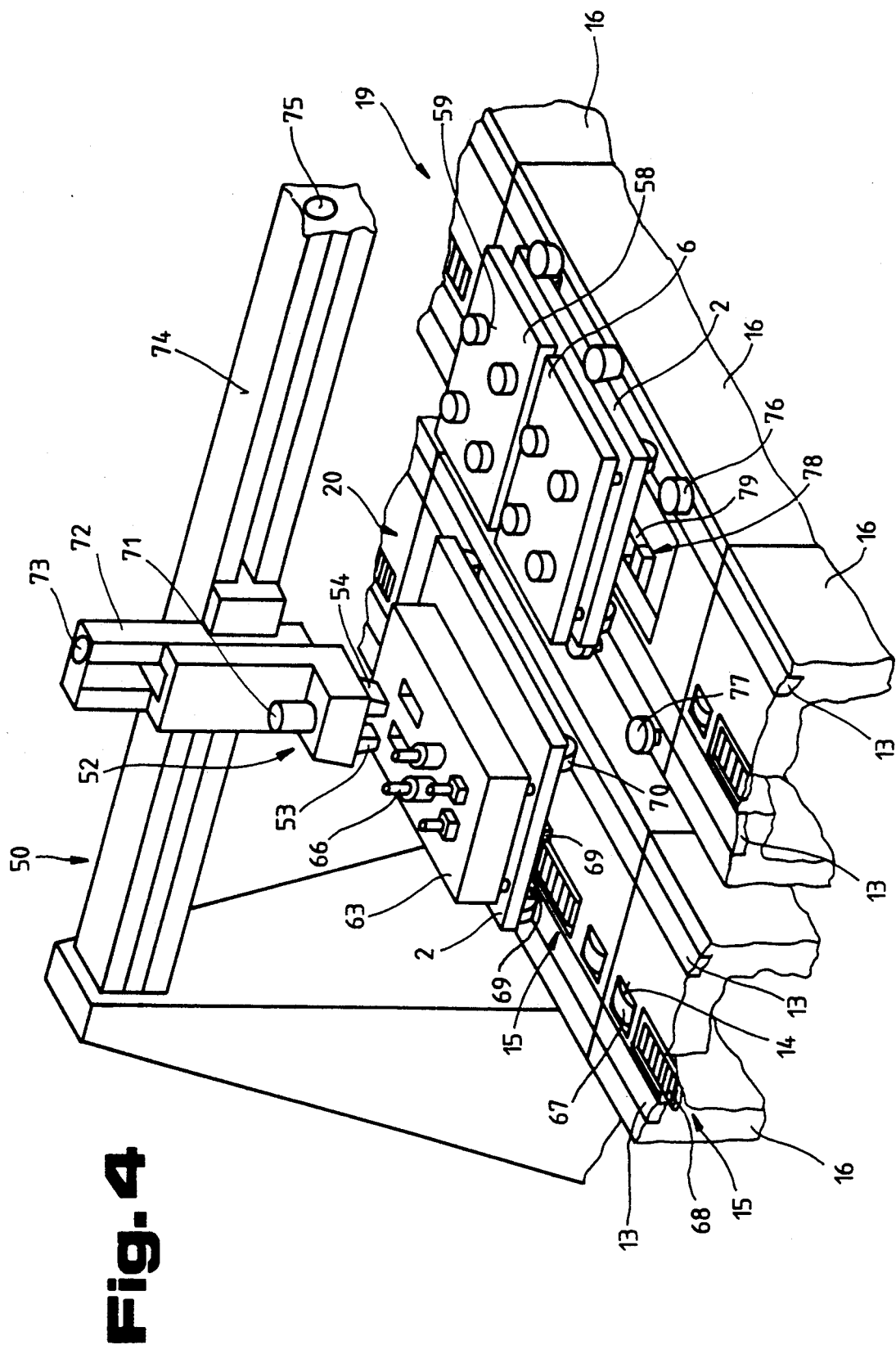
FIG. 4 shows an extremely simplified, diagrammatical view of part of a production installation in the region of an assembly cell with the drives and positioning devices associated with the individual carriages and the handling device.

FIG. 4 shows part of the parallel conveying path 19 and the subsidiary conveying path 20 in the region of the handling device 50. The individual transport stations 16 comprise housings on whose upper side the vertical guideways 13 formed by guide rails, for example hardened steel rails, are disposed. Disposed between the vertical guideways 13 are lateral guide rollers 67 forming lateral guideways and the toothed belts 68 of the feed device 15. The side edges of the toothed belts 68 and lateral guide rollers 67 cooperate with lateral guide rails 69 which are disposed on the underside of the carriages 2. Guide rollers 70 which are movable on the vertical guideways 13 are used for vertical guidance of the carriages 2. As already described earlier, pallet trays 63 and 6 are disposed on the carriages 2. The pallet tray 63 is provided with swapping tools 66 for the grab fingers 53 and 54 of the handling device 50. An actuating drive 71 is provided for actuating the grab fingers 53, 54. The grab fingers are also movable along a vertical guideway 72 by means of an integrated adjusting drive 73. They are similarly movable along a horizontal guideway 74 by means of an adjusting drive 75 incorporated therein. In order to achieve precise positioning for the individual work processes, the carriages 2 with the pallet trays 6 and 58, on which assembly receivers 59 are disposed, are driven, not by the feed device 15 which has a toothed belt 68 and in which forward movement and positioning of the carriages 2 are effected for example by a stepping motor, but by friction rollers 76 which are elastic in a radial direction and are supported on side edges of the carriages 2. These press the carriages 2 against guide rollers 77 formed, for example, by ball bearings which are disposed adjacently on the opposite side of the vertical guideway 13 and thereby form a precise reference position for the carriages 2 with the pallet trays 6 and 58 disposed thereon. For positioning of the carriages 2 longitudinally of the lateral guideways 14 or the lateral guideways 14 formed by the guide rollers 77 and the friction rollers 76, a positioning device 78 is used which cooperates with stops 79 disposed on the underside of the carriages 2 and permits positioning of a high repeat accuracy and precision over extended periods of use. As a result, precision joining and assembly processes may be carried out. Naturally, in the case of particularly awkward parts or parts which require precise positioning before being grasped, it is possible also to provide a feed device formed by friction rollers 76 and guide rollers 77 in the region of the subsidiary conveying path in which the individual parts 4 are positioned for removal. The same naturally applies to the stand-by conveying path 44 if the change tools 65 or swapping tools 66 to be interchanged need to be precisely positioned in this way before being interchanged.

Figure 5:
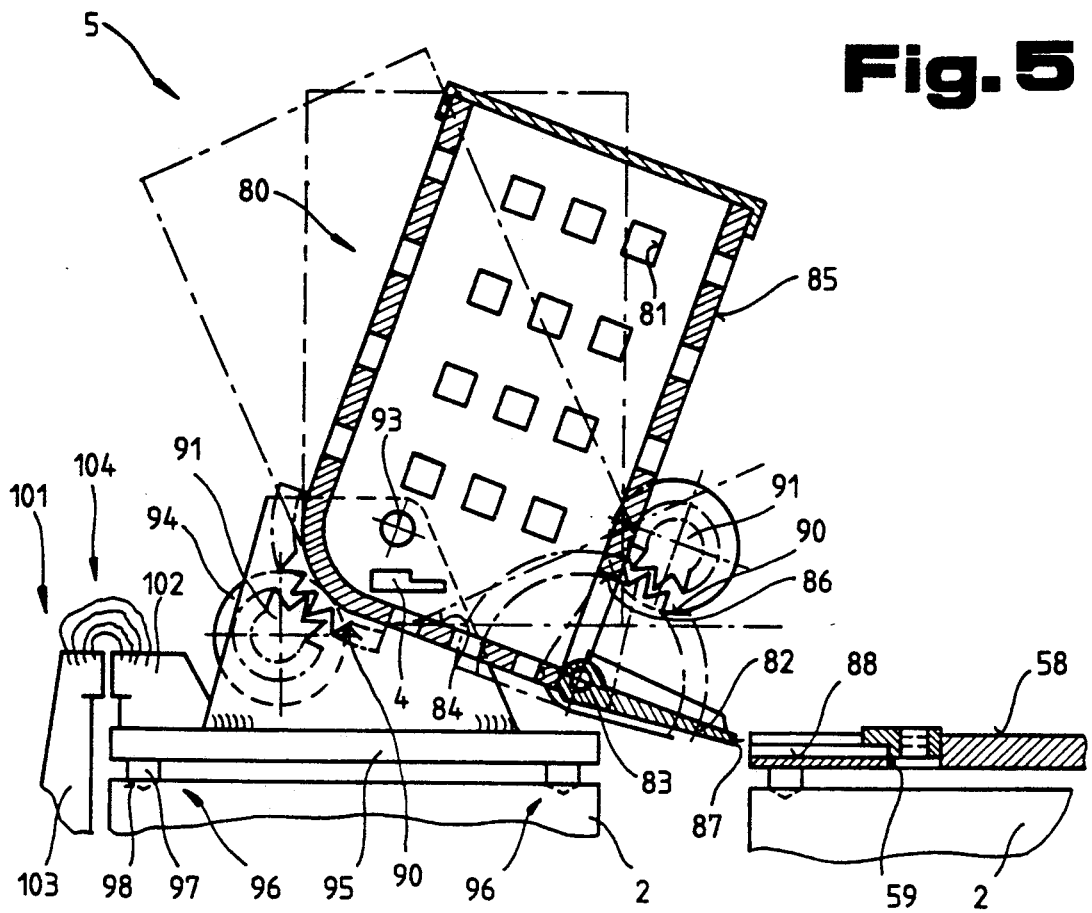
FIG. 5 shows an extremely simplified, diagrammatical side view, partially in section, of a container formed by a grab holder and disposed on a carriage.
Figure 6:
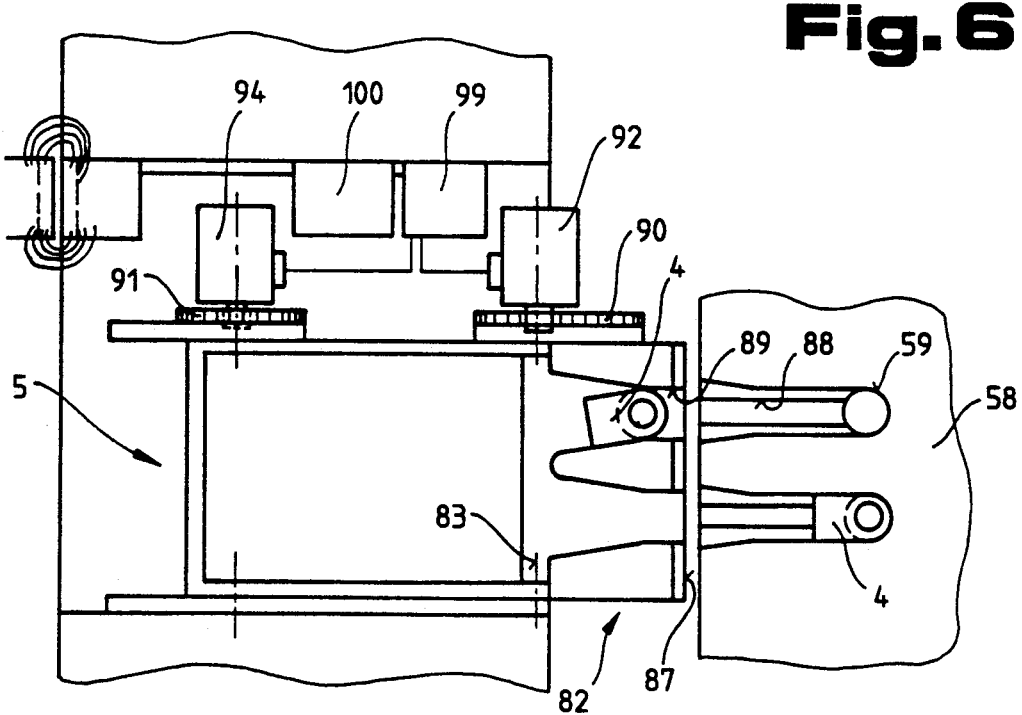
FIG. 6 shows a plan view of the grab holder of FIG. 5.
Figure 7:
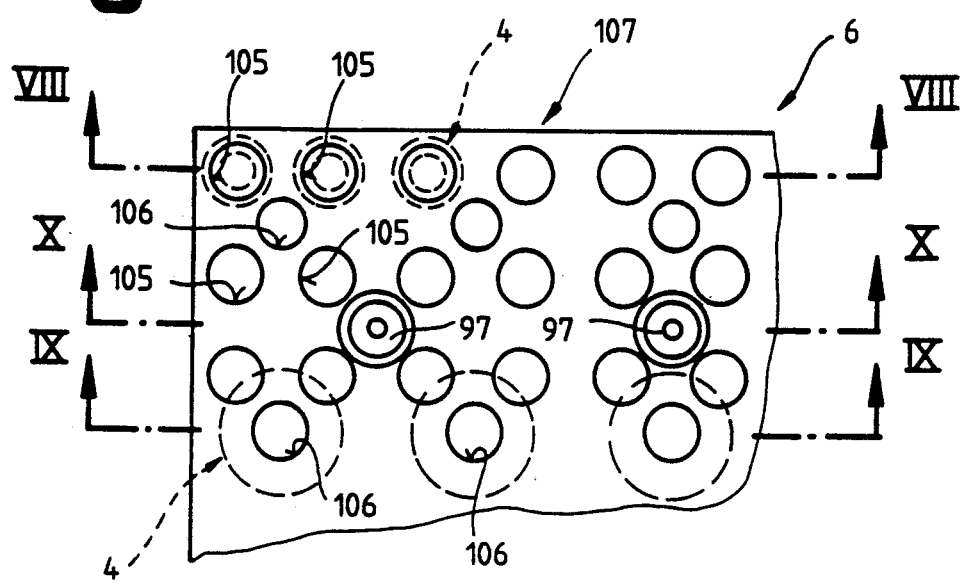
FIG. 7 shows a plan view of part of a pallet tray.
Figure 8:
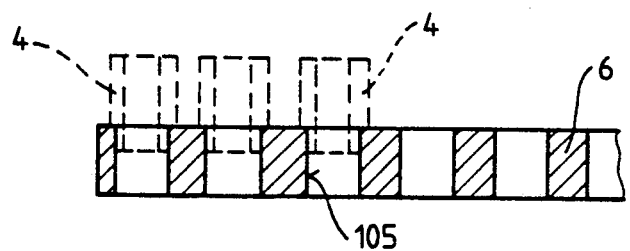
FIG. 8 shows a section along the lines VIII—VIII of FIG. 7 of the pallet tray of FIG. 7.

FIGS. 5 and 6 show a container 5 formed by a grab holder 80. The container 5, i.e. grab holder 80, is provided with openings 81 so that it can be used simultaneously as a wash tank for the individual parts 4 stored therein, e.g. rubber rings. The grab holder 80 is also provided with a chute 82 which is adjustable about an axis 83 in the region of its base 84 out of a position adjacent to a side wall 85, in which it closes an outlet opening 86, into an output position in which a front end 87 of the chute 82 is flush with guide channels 88 on a pallet tray 58 having assembly receivers 59 which is disposed on a carriage 2.

As is shown more clearly in FIG. 6, guide channels 89 are disposed in the outlet region of the chute 82 and are flush with guide channels 88 on the pallet tray 58. The individual parts 4 therefore only have to be pushed by the operator in the correct direction into the guide channel 89 and they can then be smoothly positioned in the assembly receivers 59. The amount of time required for inserting the individual parts 4 on the pallet trays 58 can therefore be advantageously reduced. Moreover, the grab holder outlet opening 86 can be closed by swivelling the chute 82 vertically about the axis 83. To actuate or swivel the chute 82, the chute may be provided with a gear ring 90 in which a driving pinion 91 engages which is rotationally connected to a drive motor 92.

It is also possible for the grab holder 80 to be capable of swivelling about a swivelling axis 93 out of the output position shown by solid lines into the other positions shown by dash-dot lines. For this purpose, the grab holder 80 may also be provided with a gear ring 90 which meshes with driving pinion 91 of a drive motor 94. The drive motors 92 and 94 may be disposed directly on the carriage 2 or alternatively the grab holder 80 may be supported with its swivelling axis 93 on a pallet tray 95 which also supports the drive motors 92 and 94. The pallet tray 95 may be positioned by means of coupling devices 96 on the carriage 2. The coupling devices comprise centering pins 97 inserted into conical recesses 98 in the carriage 2.

Upstream of the drive motors 92 and 94 are a common control device 99 and an energy-storing device 100 for supplying energy to the control device 99 and the drive motors 92 and 94. However, as an alternative to the energy-storing device 100, energy may be supplied in the operative range of the grab holders 80, in which swivelling of the grab holder 80 or the chute 82 is required, by means of a diagrammatically indicated transfer device 101. This has a transfer element 102 which is disposed on the pallet tray 95 and with which a transfer element 103 fixed, for example, along the lateral and vertical guideways 14, 13 at specific intervals or at storage locations or in the region of the subsidiary conveying path 20 is associated. Energy and/or data may be transferred by way of an energy field 104, which is indicated in the diagram by force lines, for example by means of an electric alternating field, heat or sound energy or a magnetic field.

Instead of the contactless transfer devices 101, transfer devices can be used which establish a direct connection between the energy storing device 100 and/or the control device 99 by means of sliding contacts or the like.

By swivelling the grab holder 80, which like swivelling of the chute 82 may of course also be effected manually, it is possible sensitively to regulate the number of individual parts 4 which fall out onto the chute 82 and to activate the holder for removing individual parts 4 and to discontinue this removal and close the grab holder 80.

FIGS. 7 to 10 show a pallet tray 6 on which various individual parts 4 may be positioned. On this pallet tray 6, which can also be placed on the carriage 2 by means of a coupling device 96, drill holes 105 and 106 are disposed in a predetermined grid. The coupling elements of the coupling device 96, which are formed by the centering pins 97, are disposed between each row of groups 107 comprising four drill holes 105 and one drill hole 106. The drill holes 105 form, for example, the corner points of a square while the drill hole 106 forms the point of intersection of the diagonals connecting the drill holes 105. If individual parts 4 which have an outer diameter only slightly greater than the diameter of the drill holes 105 and 106 are then inserted in the pallet tray 6, as is shown for example in FIG. 8, one individual part 4 can be inserted into each of the drill holes 105 and 106.

Figure 9:
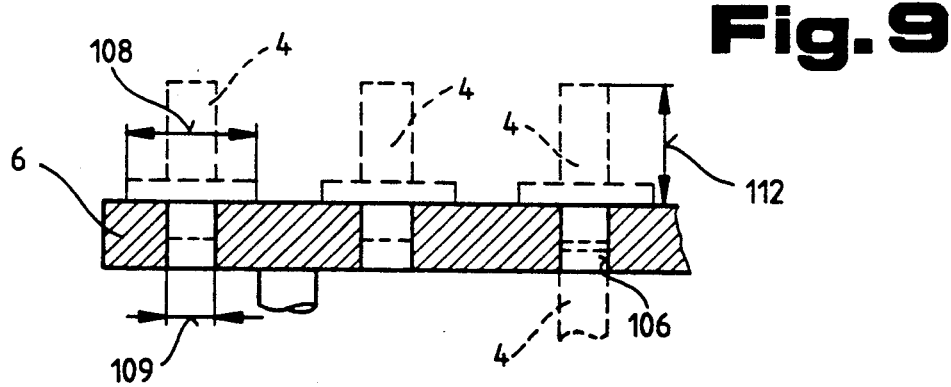
FIG. 9 shows a section of the pallet tray along the lines IX—IX of FIG. 7.

On the other hand, if, as FIG. 9 shows, the individual parts 4 have a much greater diameter 108 than a diameter 109 of the drill holes 105 and 106, these individual parts 4 can be positioned in the drill holes 106, with no individual parts 4 being inserted in the drill holes 105.

Figure 10:
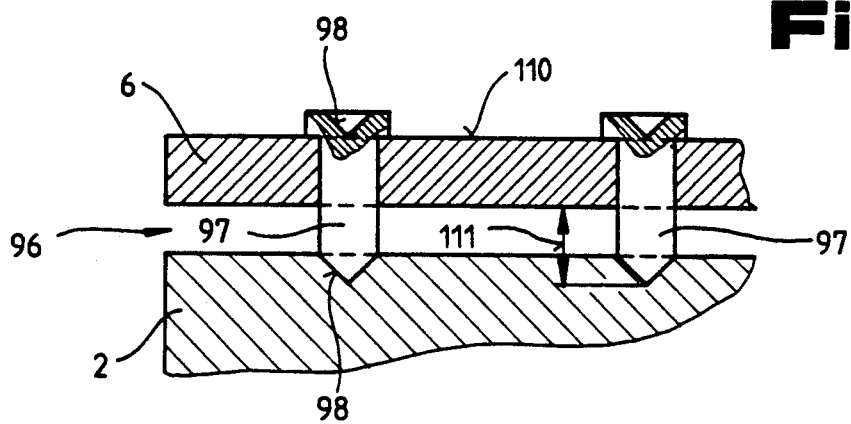
FIG. 10 shows a section of the pallet tray along the lines X—X of FIG. 7.

As FIG. 10 shows, the centering pins 97 have on their side facing an upper side 110 of the pallet tray 6 conical recesses 98 corresponding to the corresponding recesses 98 in the carriage 2. This allows several of such pallet trays 6 to be stacked one on top of the other in a non-slip manner by means of the same centering pins 97 forming the coupling elements. Moreover, if a length 111 of the centering pins 97 is dimensioned in such a way as to be slightly shorter than a length 112 of the individual parts 4 of FIG. 9, the individual parts 4 can be guided in both end regions since the individual parts 4 of the pallet tray 6 underneath engage from below into the drill holes 106 of the pallet tray above, this being diagrammatically indicated in FIG. 9. Thus, it is advantageously possible to prevent the individual parts 4 from sloping or tilting and consequently suffering surface damage in the pallet trays 6.

FIGS. 11 to 13 show the grab device 52 on an enlarged scale.

This grab device 52 has two adjustable grab fingers 113, 114 which extend parallel to one another and are adjustably supported parallel to one another, for example, by means of the actuating drive 71 and a transfer mechanism 115, this being diagrammatically indicated by the dashed lines outlining a further position of a part of the grab fingers 113, 114. Each of the two grab fingers 113, 114 is adjustable in the directions of the double arrows 116. Thus, the grab fingers 53 and 54, which are held interchangeably by a locking device 117 in the grab fingers 113, 114, can be moved apart from one another or together. Disposed below the grab device 52 is a part of a pallet tray 63, for example a retooling pallet, in which receivers 118, 119 for the grab fingers 53 and 54 are disposed. As is shown more clearly in FIG. 13, these receivers 118, 119 may be arranged one behind the other on the pallet tray 63 at a distance 120. This distance 120 is purely discretionary but must be slightly greater than half the width 121 of the grab finger 113 or 114 and preferably they are spaced apart from one another by the entire width 121 or more.

For rapid interchange of the grab fingers 53 and 54 of the grab device 5 while the handling device 50 is in operation, the locking device is designed so that it unlocks automatically after the grab fingers 53, 54 have been deposited in the receivers 118, 119. For this purpose, support rails 122 on which locking plungers 123 are supported are disposed on either side of the receivers 118, 119. These locking plungers 123 are urged by a spring arrangement 124, e.g. a helical spring, into their lower end position shown in FIG. 11 in which a ball catch 125 engages through a link path 126 in the locking plunger 123 through an opening 127 into a locking recess 128 in the grab fingers 53 and 54. In the position shown in FIG. 11, the link path 126 has a depth which increases towards the support rails 122, with a maximum depth 129 being greater than a penetration depth 130 of the ball catch 125 into the locking recess 128 of the grab fingers 53 and 54. The result is that, after lowering of the grab device 52—as shown in particular in the left half of FIG. 12, the ball catch 125 retracts entirely into the link path 126, thereby permitting the grab fingers 53 and 54 to move longitudinally, parallel to the longitudinal direction of the support rails 122. By moving the carriage 2 with the pallet tray 63—as shown in FIG. 4—by means of the feed device 15 longitudinally of the vertical guideway 13, the grab trays 53 and 54 are guided out of a longitudinal guideway 131 in the grab fingers 113 and 114 and remain in the receivers 118, 119.

The grab fingers 113, 114 may then be centered by means of grab trays 132, for example, in adjacent receivers 118, 119. Then, in a reverse-sequence displacement movement, the grab trays 132 are introduced into the longitudinal guideways 131 and, after raising of the grab device 52 and raising of the locking plungers 123, are locked by the ball catch 125 into their desired operating position in the grab fingers 113, 114.

Figure 14:
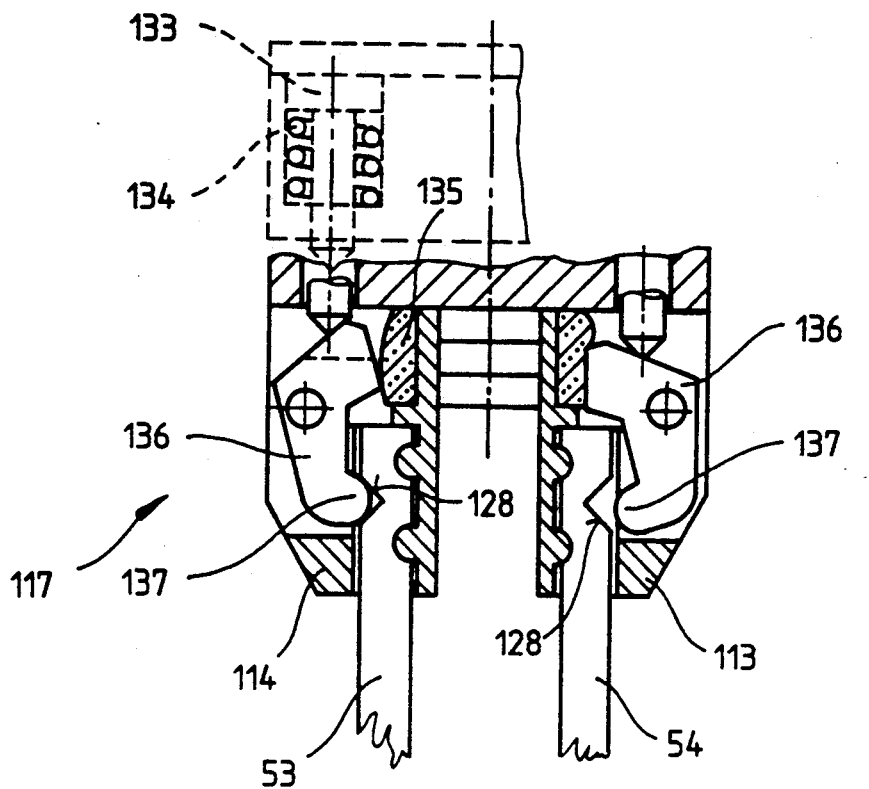
FIG. 14 shows a side sectional view of another embodiment of a change device for grab trays of the grab device.
Figure 15:
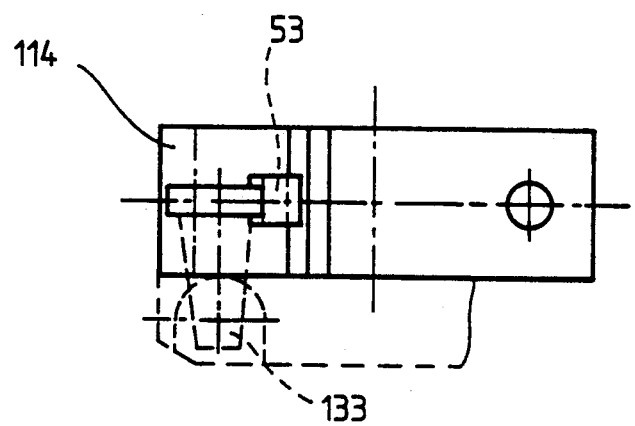
FIG. 15 shows a plan view of the grab device of FIG. 14.

FIGS. 14 and 15 show another embodiment of a locking device 117 for grab fingers 53 and 54 in which unlocking is effected by unlocking pistons 133 instead of the locking plungers 123. A pressure medium can be applied from above onto the unlocking piston 133 so that it is lowered against the action of a spring, in particular a helical spring 134, out of the position shown by dashed lines into the position shown by solid lines, whereupon a pivoted lever 136 which is held by a resiliently deformable material 135 in its locked position is pivoted outwards, as shown in the right half of FIG. 14, so that a locking extension 137 comes out of the locking recess 128 of the grab fingers 53 and 54.

This releases the longitudinal movement of the grab fingers 53 and 54 as already described with reference to FIGS. 11 to 13 and they may then be extended out of the grab fingers 113, 114 through a relative movement between the pallet tray 63 or its receivers 118, 119 and the handling device 50. As is further indicated in FIG. 15, it is also possible for the unlocking piston 133 to be laterally offset relative to the grab fingers 53, 54 or the pivoted levers 136.

Figure 16:
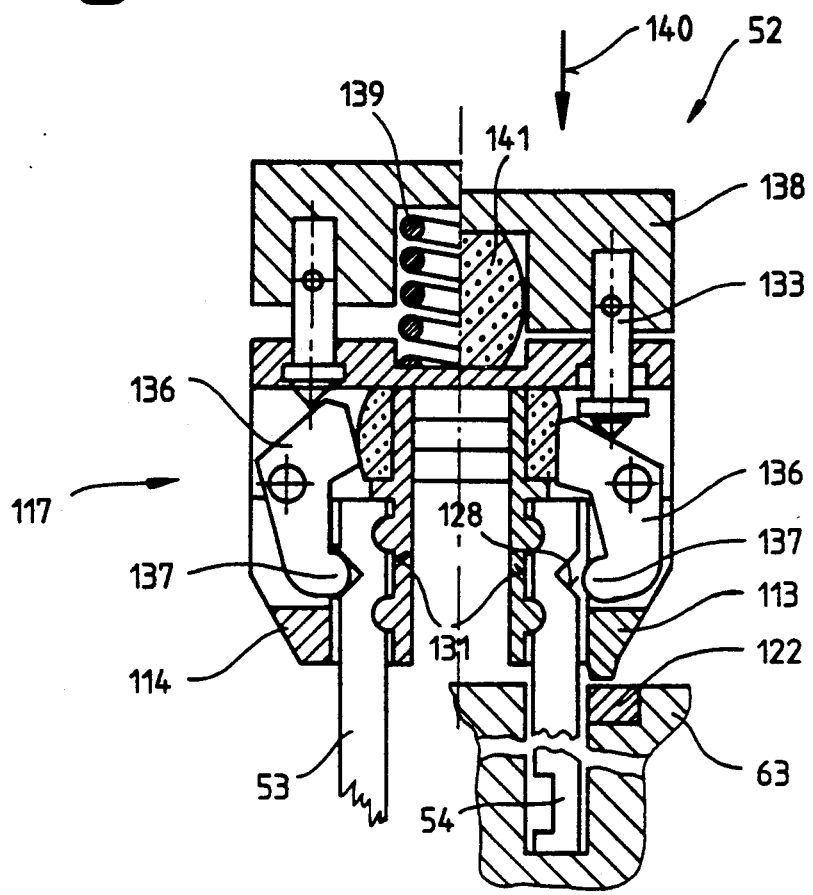
FIG. 16 shows a side sectional view of another construction of a change device for the grab trays of the grab device.
Figure 17:
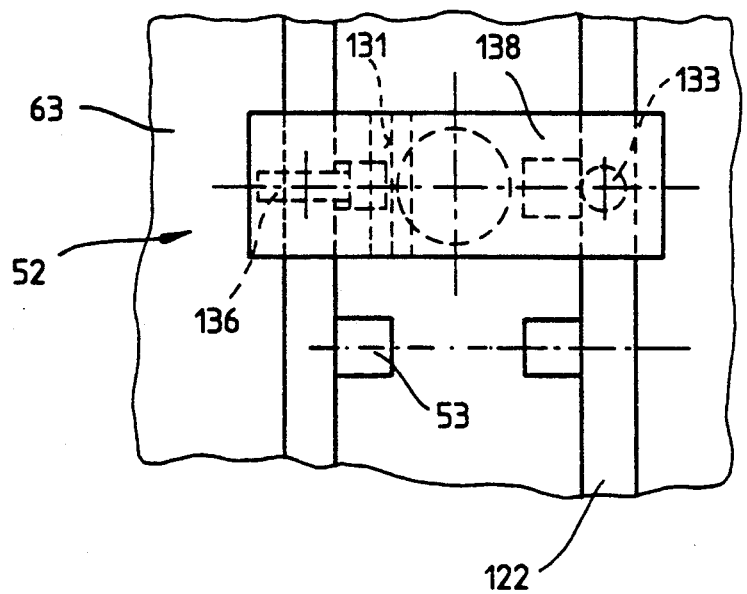
FIG. 17 shows a plan view of the grab device of FIG. 16.

FIGS. 16 and 17 show a modification of a locking device 117, similar to that of FIGS. 14 and 15, between the grab fingers 113, 114 and the grab fingers 53 and 54. In place of the unlocking position 133, however, here the grab fingers 113, 114 are adjustably supported relative to a housing 138 of the grab device 52. The grab fingers 113 and 114 and the housing 138 are fixed at a distance from one another by means of a helical spring 139, as is shown in the left half of FIG. 16, in which position the grab fingers 53, 54 are locked by the pivoted levers 136 in the grab fingers 113 and 114. Instead of the helical spring 139, however, any other material 141 which is resiliently deformable in the adjusting direction—arrow 140 for example a rubber spring or the like, may be used. If the grab device 52 is then lowered along the guideway 72 by means of the adjusting drive 73 of the handling device 50 so that the grab fingers 113, 114 come to rest on support rails 122 of the pallet tray 63, the relative movement between the grab fingers 113 and 114 and the housing 138 causes unlocking pistons 133—as shown in the right half of FIG. 16—to be pressed onto the pivoted levers 136 and their locking extensions 137 move out of the locking recesses 128 of the grab fingers 53 and 54. This frees the longitudinal movement of the grab fingers 53, 54 in the longitudinal guideway 131 and, by moving the grab fingers 113, 114, the grab fingers 53, 54 can be pushed out of these guideways. Naturally, according to the invention, there are the possible options of either moving the carriages 2 with the pallet trays 63 or the diversion pallet relative to the grab device 52, or adjusting the grab device 52 by disposing an additional axis of movement on the handling device 50.

The above-described construction of the grab device 52 and the locking device 117 may also be used independently of the other features herein disclosed, and permits a rapid grab exchange with a low mechanical effort in handling devices having linearly movable axes and in particular movable carriages 2 with retooling pallets which are positioned relative to these axes.

It is possible for the production installations, as shown in FIG. 2, to be provided with safety devices 142 to protect the operating personnel, these safety devices possibly being arranged, for example, so as to be lowered between the conveying paths. Drives 143 may also be provided for sliding these safety devices in and out. These safety devices may furthermore simultaneously perform noise reduction functions.

What is claimed is:

1. A production installation for assembling or processing structural components comprised of individual parts, which comprises
   (a) drive pallets carrying the structural components or the individual parts, the drive pallets comprising
      (1) power-driven means for handling the structural components or the individual parts,
   (b) a conveyor track comprised of individual and separable conveyor track sections, each conveyor track section comprising
      (1) vertical and lateral guideways for the drive pallets,
   (c) a feed device at each conveyor track section operable for conveying the drive pallets independently of each other along the vertical and lateral guideways of the conveyor track,
   (d) means for supplying operating energy to the power-driven handling means on the drive pallets at selected locations along the conveyor track, and
   (e) a handling device at each one of the selected locations.

2. The production installation of claim 1, wherein the means for supplying operating energy to the power-driven handling means comprises at each one of the selected locations an energy-storing device and an operating control device receiving energy therefrom and connected to the power-driven handling means.

3. The production installation of claim 1, wherein the means for supplying operating energy to the power-driven handling means comprises at each one of the selected locations an energy and control data transfer device connected to the power-driven handling means.

4. The production installation of claim 3, wherein the transfer device comprises an energy transfer element disposed on the drive pallet and a fixed energy transfer element at each selected location, an energy field being generated between the transfer elements to transfer energy from the fixed energy transfer element to the energy transfer element disposed on the drive pallet.

5. The production installation of claim 1, further comprising display elements on the drive pallets.

6. The production installation of claim 1, further comprising containers holding the structural components or individual parts, each one of the containers defining an outlet opening, and the handling means comprising a pivotal chute closing the outlet opening in one pivotal position and being pivotal by the operating energy supplying means into a pivotal position in which the outlet opening is open.

7. The production installation of claim 1, further comprising a coding element on each one of the drive pallets and decoding devices scanning the coding elements on the drive pallets along the conveyor track.

8. The production installation of claim 1, wherein the conveyor track defines a main conveying path for transporting the drive pallets in a conveying direction, a conveying path extending parallel to the main conveying path and an auxiliary conveying path extending between, and parallel to, the main and parallel conveying paths, the drive pallets being disposed on the conveying path extending parallel to the main conveying path, and further comprising assembly pallets disposed on the auxiliary conveying path for receiving structural components or individual parts from the drive pallet.

9. A production installation for assembling or processing structural components comprised of individual parts, which comprises
   (a) drive pallets carrying the structural components or the individual parts, the drive pallets comprising
      (1) power-driven means for handling the structural components or the individual parts,
   (b) a conveyor track comprised of individual and separable conveyor track sections, each conveyor track section comprising
      (1) vertical and lateral guideways for the drive pallets,
   (c) a feed device at each conveyor track section operable for conveying the drive pallets independently of each other along the vertical and lateral guideways of the conveyor track,
   (d) means for supplying operating data to the power-driven handling means on the drive pallets at selected locations along the conveyor track, and
   (e) a handling device at each one of the selected locations.

* * * * *